United States Patent

Slump et al.

[11] Patent Number: 5,881,163
[45] Date of Patent: Mar. 9, 1999

[54] X-RAY EXAMINATION APPARATUS WITH AN IMAGING ARRANGEMENT HAVING A PLURALITY OF IMAGE SENSORS

[75] Inventors: Cornelis H. Slump, Oldenzaal; Marton O. Harms, Hengelo; Geert J. Laanstra, Almelo; Rudolph M. Snoeren, Eindhoven, all of Netherlands

[73] Assignee: U.S. Philips Corporation, New York, N.Y.

[21] Appl. No.: 573,917

[22] Filed: Dec. 18, 1995

Related U.S. Application Data

[63] Continuation of Ser. No. 216,982, Mar. 23, 1994, abandoned.

[30]    Foreign Application Priority Data

Mar. 30, 1993  [EP]  European Pat. Off. .............. 93200898

[51] Int. Cl.⁶ ...................................................... G06K 9/00
[52] U.S. Cl. ............................ 382/132; 382/284; 378/99; 348/584
[58] Field of Search ..................................... 382/128, 132, 382/284, 298; 358/450; 348/239, 263, 584, 598; 378/99

[56]          References Cited

U.S. PATENT DOCUMENTS

| | | | |
|---|---|---|---|
| 4,380,818 | 4/1983 | Pfeiler | 378/99 |
| 4,503,460 | 3/1985 | Sklebitz | 358/111 |
| 4,578,812 | 3/1986 | Yui | 382/41 |
| 4,635,293 | 1/1987 | Watanabe | 382/6 |
| 5,014,198 | 5/1991 | Umemura | 364/413.13 |
| 5,123,056 | 6/1992 | Wilson | 382/284 |
| 5,140,647 | 8/1992 | Ise et al. | 382/284 |

OTHER PUBLICATIONS

"Comparison of Interpolating Methods for Image Resampling" J. Anthony Parker et al, IEEE Transactions on Medical Imaging, vol. MI–2, No. 1, Mar. 1983, pp. 31–39.

*Primary Examiner*—Christopher S Kelley
*Attorney, Agent, or Firm*—Dwight H. Renfrew, Jr.

[57]            ABSTRACT

An imaging arrangement including a multi-sensor for use in an x-ray examination apparatus is described that combines a plurality of partially overlapping sub-images, resulting in an increased effective sensor area when compared to a single sensor-image. Thus an imaging arrangement is provided suitable for imaging a large area output screen of an image intensifier by way of semiconductor image sensors. Image artifacts owing to variations in the alignment of the respective image sensors are corrected for by applying geometric transformation to respective electronic sub-image generated by the image sensors. The transformed electronic sub-images are assembled into a recombined image. Further image quality improvement is obtained by performing evening operations in overlapping regions of the transformed sub-images.

18 Claims, 4 Drawing Sheets

X-RAY EXAMINATION APPARATUS WITH AN IMAGING ARRANGEMENT HAVING A PLURALITY OF IMAGE SENSORS

This is a continuation of application Ser. No. 08/216,982, filed Mar. 23, 1994 now abandoned.

BACKGROUND OF THE INVENTION

1. Field of the Invention

The invention pertains to an x-ray examination apparatus including an x-ray source for producing an x-ray image by irradiating an object, radiation conversion apparatus for converting the x-ray image into a visible image, an imaging arrangement incorporating a plurality of image sensors for converting sub-images in the form of parts of the visible image into primary electronic sub-images and an image processor for producing a recombined electronic image from the primary electronic sub-images. The invention also relates to an imaging arrangement for use in an x-ray examination apparatus.

2. Description of the Related Art

An x-ray examination apparatus of said kind is known from the U.S. Pat. No. 4,503,460.

An x-ray examination apparatus as described in the cited reference comprises multiple image conversion means in that a plurality of semiconductor image sensors and optical coupling means having a plurality of lenses are provided for imaging respective regions of an output screen of an x-ray image intensifier onto respective semiconductor image sensors. Respective sub-images are detected by the semiconductor image sensors and image assembling is carried out by an electronic circuit to produce a recombined image from the sub-images. Only a limited number of errors in the recombined image are corrected together with image reconstruction. The cited reference teaches only about correcting errors due to failing photo-sensitive elements of the image sensors and about errors due to differences between average sensitivities of different image sensors.

SUMMARY OF THE INVENTION

It is inter alia an object of the invention to provide an x-ray examination apparatus with an imaging arrangement having a plurality of image sensors provided with an image processing arrangement for composing an image by assembling a plurality of sub-images into a recombined image, that is substantially free of artifacts.

An x-ray examination apparatus according to the invention is characterized in that said image processing means comprises transformation means for producing transformed electronic sub-images by performing respective geometrical transformations on respective primary electronic sub-images.

Differences in orientations of sub-images from which the recombined image is assembled are an important cause of artifacts in a recombined image. Especially in medical examination applications, artifacts are detrimental to the diagnostic value of the recombined image. Such differences arise due to differences in orientation of respective image sensors, notably charge-coupled devices when straightforwardly assembling sub-images into a recombined image. Only to a minor extent such artifacts can be eliminated or avoided when image processing is applied limitedly to edges of adjoining sub-images. Differences in orientation of said sub-images can be corrected for and ensuing transformed sub-images can be assembled into a recombined image, substantially without artifacts attributable to differences in orientation of respective sub-images by applying a geometrical transformation to primary electronic sub-images.

A preferred embodiment of an x-ray examination apparatus according to the invention, wherein the imaging arrangement further comprises memory means for storing electronic sub-images, an electronic sub-image having the form of pixel-values having pixel-addresses, a pixel-address corresponding to a position in a relevant electronic sub-image, a pixel-value pertaining to said pixel-address corresponding to a brightness value of said position in a relevant electronic sub-image, is characterized in that said geometrical transformation is arranged to assign pixel addresses of respective primary electronic sub-images to pixel addresses of respective transformed electronic sub-images.

Transformed electronic sub-images, that are the result of a geometrical transformation applied to primary electronic sub-images are formed as follows. Memory means are provided for storing pixel-values corresponding to brightness-values at positions in the primary electronic sub-image at storage-addresses corresponding to said positions. A geometrical transformation is then performed by converting addresses of respective stored electronic sub-images into addresses of transformed electronic sub-images.

Another preferred embodiment of an x-ray examination apparatus, wherein the imaging arrangement further comprises memory means for storing electronic sub-images, an electronic sub-image having the form of pixel-values having pixel-addresses, a pixel-address corresponding to a position in a relevant electronic sub-image, a pixel-value pertaining to said address corresponding to a brightness value of said position in a relevant electronic sub-image, according to the invention is characterized in that said geometrical transformation is arranged for assigning pixel addresses of respective transformed electronic sub-images to pixel addresses of respective primary electronic sub-images.

Transformed electronic sub-images, that are the result of a geometrical transformation applied to primary electronic sub-images are formed as follows. Memory means are provided for storing pixel-values corresponding to brightness-values at positions in the stored electronic sub-image and storage-addresses correspond to said positions. A geometrical transformation is then performed by assigning addresses of respective primary electronic sub-images into addresses of transformed electronic sub-images.

A further preferred embodiment of an x-ray examination apparatus according to the invention is characterized in that the transformation means comprises a pixel-value interpolation means for determining a pixel-value for a pixel of a respective transformed electronic sub-image whereto a pixel-address of a respective primary electronic sub-image is assigned.

From selected addresses in a transformed electronic sub-image, the transformed image can be built-up by assigning pixel-values of a primary electronic sub-image. When a transformed electronic sub-image and a primary electronic sub-image are related by a geometrical transformation, said primary electronic sub-image is related to the transformed electronic sub-image by another geometrical transformation, viz. the two geometrical transformations being the inverse of one another. An address-value of the stored sub-image is obtained by applying an appropriate transformation to address-values of the transformed electronic sub-image. This computation can lead to a fractional address, i.e. an address-value that lies between various neighboring addresses of the stored electronic sub-image. A pixel-value of the address at issue of the transformed electronic sub-image is obtained by interpolation of pixel-values of said neighboring addresses of the stored electronic sub-image.

A further preferred embodiment of an x-ray examination apparatus according to the invention is characterized in that the image processing means comprise a pixel value interpolation means for determining values of pixels of the recombined electronic image which correspond to sensor elements of image sensors lying close to neighboring edges of such image sensors, by interpolation between values of pixels lying close to neighboring edges of the transformed electronic sub-images.

When a recombined image is assembled from transformed electronic sub-images, image quality is improved by evening pixel-values in regions in the recombined image corresponding to boundary-regions of the transformed electronic sub-images. Evening of pixel-values is adequately achieved by weighted averaging of pixel-values in the boundary regions of said sub-images.

A further preferred embodiment of an x-ray examination apparatus according to the invention is characterized in that the pixel-value interpolation means are arranged for nearest-neighbor interpolation.

An interpolation by nearest-neighbor interpolation is provided having as a particular advantage that it is carried out comparatively rapidly. Nearest-neighbor interpolation in fact amounts to rounding-off. A fractional address in a primary electronic sub-image is obtained by applying a geometrical transformation to a pixel-address in a transformed electronic sub-image. Then to the pixel at issue in the transformed image there is assigned the pixel-value of the pixel-address of the primary electronic sub-image that is obtained by rounding said fractional pixel-address to the nearest neighboring pixel-address.

A further preferred embodiment of an x-ray examination apparatus in according to the invention is characterized in that the pixel-value interpolation means are arranged for bi-linear interpolation.

An interpolation by bilinear interpolation is provided that is sufficiently rapidly carried out and provides transformed electronic sub-images being substantially free of artifacts due to transforming. In bilinear interpolation a pixel-value in a transformed electronic sub-image is assigned by weighted averaging pixels surrounding said fractional pixel-address obtained by geometrical transformation of the pixel address in the transformed electronic sub-image. Weight factors for said weighted averaging are determined by differences between coordinate values of said fractional pixel-address and of addresses said surrounding pixels.

A further preferred embodiment of an x-ray examination apparatus according to the invention is characterized in that the pixel-value interpolation means are arranged for cubic-spline interpolation.

More complicated interpolating methods for use in image-transformation of medical x-ray images are known per se from the IEEE Transactions on Medical Imaging MI-2 (1983), pp. 31–39. In particular in an x-ray examination apparatus according to the invention it is attractive to employ such more complicated interpolating methods. An interpolation by cubic spline interpolation is provided that extends over at least four pixels and smoothing of high-resolution detail is avoided so that small details in an image are conserved to a practically useful extent by the interpolation. For images having an abundance of diagnostically valuable details, the improvement of the quality of the interpolation outweighs the larger computational burden for performing cubic-spline interpolation.

A further preferred embodiment of an x-ray examination apparatus according to the invention is characterized in that the transformation means comprises a look-up-table for converting addresses of respective first electronic sub-images into addresses of respective second electronic sub-images, pixel-addresses of said first and second electronic sub-images, respectively, being related by a geometrical transformation.

Pixel-addresses of said first and second electronic sub-images need be related to perform geometrical transformations between a first and a second electronic sub-image. This is achieved by employing a look-up-table being stored in a rapidly accessible memory.

A further preferred embodiment of an x-ray examination apparatus according to the invention is characterized in that the transformation means comprises address-value computation means for computing address-values for respective second electronic images from addresses of respective first electronic images, being related by a geometrical transformation.

Pairs of pixel-addresses of pixels in respective electronic sub-images being related by a geometrical transformation are obtained by calculation of pixel-addresses. Such calculations are rapidly performed by employing electronic calculation means notably arranged for performing matrix-computations.

A further preferred embodiment of an x-ray examination apparatus according to the invention is characterized in that the geometrical transformation comprises a translation and a rotation.

Image artifacts in the recombined image owing to differences in orientations of sub-images are avoided by correcting for differences in orientation by applying a geometrical transformation that is a composition of a rotation and a translation. Such a composition is known as an affine transformation. An affine transformation is applied to an electronic image being available from a memory means by transforming address values by calculation by computation means for calculating transformed address values in accordance with a required affine transformation. In addition, the affine transformation may comprise scaling of a primary electronic image so as to correct for differences in magnification or focusing of respective parts of the visible image on respective image sensors.

A further preferred embodiment of an x-ray examination apparatus according to the invention is characterized in that the geometrical transformation is dependent on pixel-addresses of pixels of primary sub-images.

The optical coupling means, notably comprising a lens system gives rise to optical distortions in the primary electronic sub-images. Such distortions have a non-linear nature, in that pixel-positions in a primary electronic image are non-linearly related to pixel-positions in a transformed electronic image. Such non-linear distortions, such as e.g. pin-cushion distortions or barrel-distortions are corrected for by employing geometrical transformations being dependent on pixel-address at issue. Notably, when a geometrical transformation is determined by a transformation matrix, the dependence sought is introduced by employing matrix elements being dependent on pixel-address values.

A further preferred embodiment of an x-ray examination apparatus according to the invention is characterized in that the transformation means comprise pixel address interpolation means for determining integer pixel addresses from computed fractional pixel addresses.

Applying a geometrical transformation to a pixel value indifferently whether to a pixel in a primary electronic sub-image or a pixel in a transformed sub-image can result in a fractional pixel-address. The pixel-address sought is subsequently obtained by applying an interpolation to said fractional pixel-address on the basis of pixel-addresses surrounding said fractional pixel-address.

A further preferred embodiment of an x-ray examination apparatus according to the invention is characterized in that said pixel-address interpolation means are arranged for determination of integer pixel addresses determined by rounding off computed fractional pixel addresses to the nearest integer value.

A particularly simple, and therefore very rapid interpolation means is constructed by arranging said interpolation means for rounding a computed transformed fractional address-value to a closest integer address-value.

A further preferred embodiment of an x-ray examination apparatus according to the invention is characterized in that the image processing means comprises amplification means for amplifying respective primary electronic sub-images.

In order to correct for further image artifacts of the sub-images owing to e.g. vignetting or brightness perturbations caused by the optical coupling means or differences of the sensitivities between respective image sensors, pixel-values in the primary electronic sub-images are amplified or reduced so as to correct for image artifacts in a respective sub-image. Thus, it is achieved that the diagnostic quality of the recombined image is still further improved in addition to absence of artifacts due to assembly of sub-images.

A further preferred embodiment of an x-ray examination apparatus according to the invention is characterized in that the transformation means is arranged as digital circuit means.

Rapid performance of geometrical transformations of electronic sub-images and corrections for further image artifacts is achieved by way of employing digital circuit means which are supplied with electronic sub-images having a digital format. As a consequence, real-time performance of assembling a recombined image that is substantially free of image artifacts is obtained so that there can be displayed sequences of recombined images showing, with good diagnostic properties, dynamic processes during x-ray examination.

A further preferred embodiment of an x-ray examination apparatus according to the invention is characterized in that said image processing means comprise zooming means for magnifying selected portions of said transformed electronic sub-images into said recombined electronic image.

The imaging arrangement with a zooming option provides for displaying a part of a recombined image containing a particular feature of interest. Said displayed part will have portions originating from sub-images of respective image sensors. A part of the recombined image can be displayed with magnification on a display and said part of the recombined image is assembled from corresponding parts of respective electronic sub-images while artifacts particularly owing to differences in orientation of said electronic sub-images are avoided.

A further preferred embodiment of an x-ray examination apparatus according to the invention is characterized in that said radiation conversion means is a parallel-plate x-ray image intensifier.

A parallel plate image intensifier comprising an output screen has an area substantially larger than a image recording face of a semiconductor image sensor, notably a charge-coupled device; therefore a multitude of charge-coupled devices is to be used for converting a visible image formed on the output screen into a number of electronic sub-images. Said sub-images are assembled into a recombined image by way of an imaging arrangement having transformation means for performing geometrical transformations as described hereinbefore. The combination of such an imaging arrangement with a parallel plate image intensifier has a particular advantage in that a flat and light-weight image detection and processing module is provided for use in an x-ray examination apparatus.

An imaging arrangement for use in an x-ray examination apparatus according to the invention preferably comprises transformation means for producing respective transformed electronic sub-images by performing respective geometrical transformations to respective primary electronic sub-images for correcting differences between orientations of respective primary electronic sub-images.

These and other aspects of the invention will become apparent from and will be elucidated with reference to the embodiments described hereinafter and with reference to the accompanying drawing.

DETAILED DESCRIPTION OF THE PREFERRED EMBODIMENTS

Figure 1:
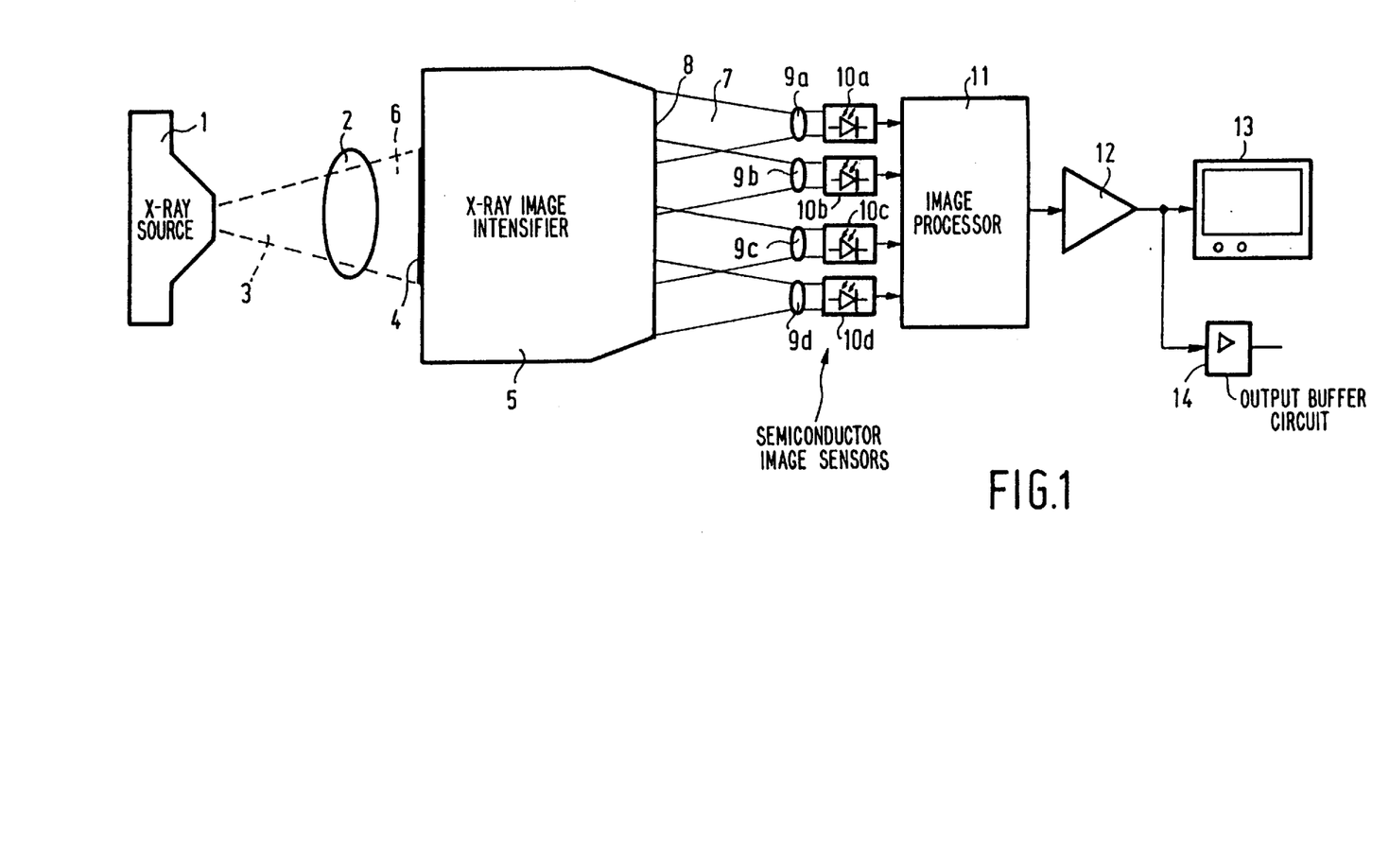
FIG. 1 shows a diagrammatic illustration of an x-ray examination apparatus according to the invention.

FIG. 1 shows a diagrammatic illustration of an x-ray examination apparatus according to the invention. An object 2, notably a patient which is to be examined, is irradiated by a beam of x-rays 3 emanating from an x-ray source 1. After the x-ray beam has passed through the object 2 an x-ray image is formed on an input screen 4 of an x-ray image intensifier 5. In the embodiment described here, the x-ray image intensifier serves as an x-ray detector. Image carrying x-radiation 6 is converted by the x-ray image intensifier into image carrying visible radiation 7, i.e. radiation having a wavelength in a range of wavelengths from wavelengths of ultraviolet radiation to wavelengths of infrared radiation, so that a visible image is produced on an output screen of the image intensifier 8. The visible image is transmitted to a plurality of semiconductor image sensors by optical coupling means, which consists of several lenses, of which there are as an example shown four lenses 9a–d. A sub-image being a part of the visible image produced on the output screen 8 is recorded by each of the semiconductor image sensors. As an example four semiconductor image sensors 10a–d are shown. For example the semiconductor image sensors can comprise a matrix of photodiodes or charge-coupled device image sensors as sensor elements. Because the area of the output screen of the x-ray image intensifier is usually very much larger than the area of an image recording face of a single semiconductor image sensor so that a plurality of sensors is required for recording the entire image; in particular when a flat x-ray image intensifier having a comparatively large area output screen is employed a multitude of semiconductor image sensors is required.

Output signals, pertaining to primary electronic sub-images i.e. electronic sub-images generated by the semiconductor image sensors are supplied to an image processor 11 in which geometric transformations of the electronic sub-images are carried out and subsequently transformed electronic sub-images are assembled into a recombined image and further image processing operations such as evening are performed. In a following video amplifier 12 the video signals generated by the image processor 11 are amplified. The amplified video signals can be supplied to a monitor 13 for the recombined image to be viewed. The video signals generated by the image processor 11 have a digital format and are amplified digitally by the video amplifier 12 and the amplified digital video signals of the recombined image can also be supplied to an output buffer circuit 14 for further processing when geometric transformation and assembling the transformed sub-images into the recombined image are carried out digitally.

Figure 2:
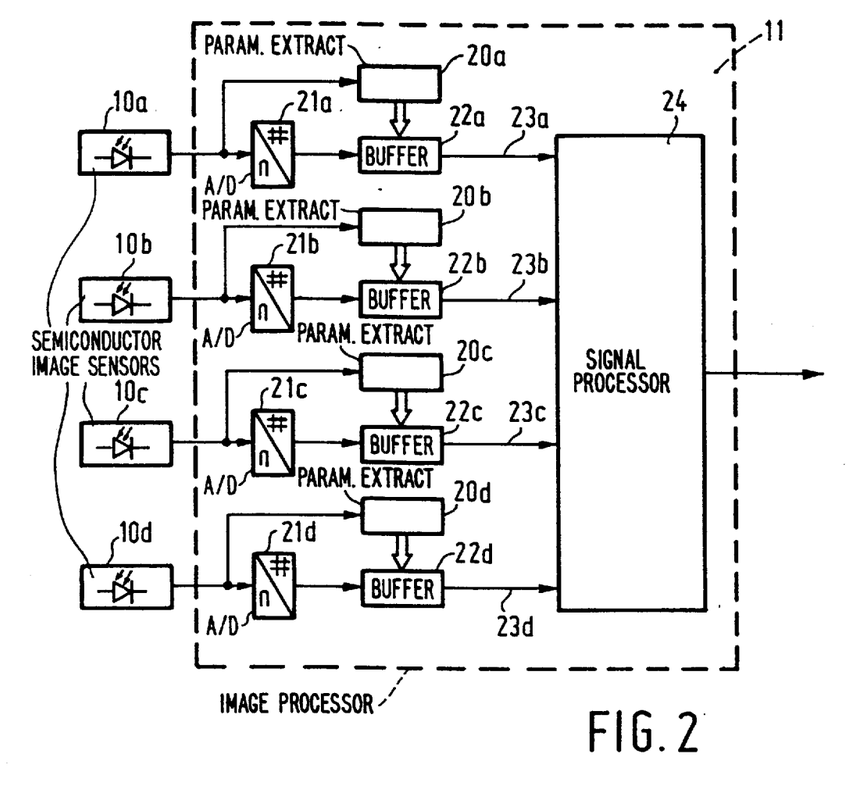
FIG. 2 shows schematic block diagram of an image processing arrangement for incorporation in an x-ray examination apparatus according to the invention.

FIG. 2 shows a schematic block diagram of an image processor 11 for incorporation in an x-ray examination apparatus according to the invention. Sub-images are recorded by a plurality of semiconductor image sensors. In the embodiment shown in FIG. 2, there are shown four semiconductor image sensors 10a–d. For example the semiconductor image sensor 10a records an upper-left quadrant of an image projected on the output screen 8 of the x-ray image intensifier, correspondingly sensor 10b records an upper-right quadrant, sensor 10c records a lower-left quadrant and sensor 10d records a lower-right quadrant of the image projected on the output screen 8. Each of the sub-images is subjected to a number of processing operations, viz. a geometric transformation for correcting for deviations of orientations of the semiconductor images sensors and of the lenses 9a–d. There is preferably some overlap between the sub-images, empirically it has been established that an overlap of a limited number of pixels is sufficient for assembling the transformed sub-images into a recombined image without introducing artifacts. Furthermore, the sub-images are corrected for brightness variations not pertaining to image information e.g. owing to vignetting and brightness distortions. Optical distortions introduced by the lenses 9a–d can also be corrected for by employing geometrical transformations depending on pixel-address values, i.e. positions in the sub-image being transformed; this is e.g. achieved by employing geometrical transformation having a transformation matrix comprising position-dependent matrix-elements. Said processing operations can be characterized by a comparatively small number of parameters. Values of said parameters are obtained from respective signals provided by the semiconductor image sensors 10a–d by means of parameter extractors 20a–d. Either these parameters can be obtained during system initialization (e.g. by using a specific input pattern), or they can be obtained during normal operation of the imaging arrangement (making the system adaptive). Each of the analog signals pertaining to respective electronic sub-images is converted into digital form by way of analog-to-digital converters 21a–d to form primary electronic sub-images. Subsequently the primary electronic sub-images are stored in digitized form in respective double-sized buffers 22a–d. Geometrical transformation of these electronic sub-images is carried out based on the contents of these buffers and controlled by the values of the aforementioned parameters to generate four output pixel-streams 23a–d, representing transformed electronic sub-images. Details of the geometrical transformation operation will be described hereinafter.

Once the electronic sub-images have been transformed, by means of a signal processor 24, they are recombined and an evening function is applied to discard any remaining transition effects. Recombination and evening will be described in more detail hereinafter with reference to FIG. 4a.

Figure 3:
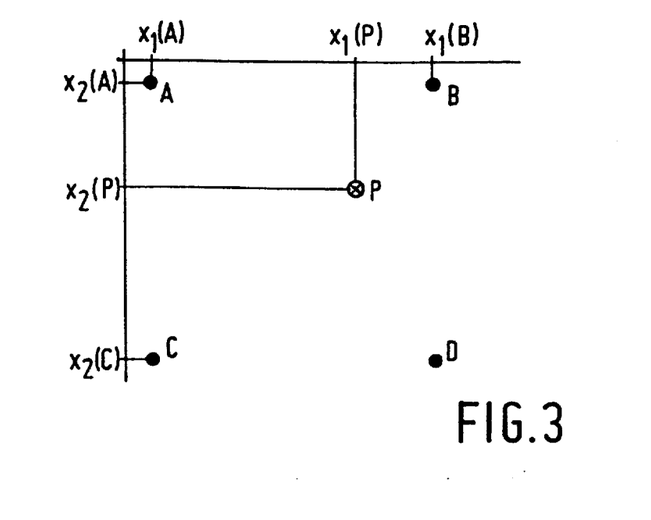
FIG. 3 shows a diagrammatic illustration of methods of interpolation as performed in an embodiment of an x-ray examination apparatus according to the invention.

FIG. 3 shows a diagrammatic illustration of a method of interpolation as performed in an embodiment of an x-ray examination apparatus according to the invention. Pixel-coordinates before transformation will be denoted by ($x_1$, $x_2$) and after transformation by ($y_1$, $y_2$). The transformation can then be written as ($y_1$, $y_2$)=F($x_1$, $x_2$) in the forward direction, or equivalently in the backward direction as ($x_1$, $x_2$)=G ($y_1$, $y_2$) The transformations F (and equivalently the transformation G) comprise preferably rotation, scaling and translation of the electronic sub-images. A very simple method to implement the transformation is obtained by using look-up-tables; for each set of input coordinates, the related output coordinates are listed in a table. Any function can be realized by this method but for four electronic sub-images each having 512×512 pixels a look-up-table having a capacity of 20 Mbit is required.

As a alternative to the use of a look-up table the image transformations are employed by way of an affine transformation. This alternative has as an advantage that it demands less memory capacity. Such an affine transformation is characterized by the form of the transformation function F, viz. F($x_1$, $x_2$)=U($x_1$, $x_2$)+t, where U represents a rotation combined with a scaling and t is a translation vector. Instead of having all coordinates directly available in a table, each set of coordinates is calculated by a dedicated processing unit. Distortions caused by the lens-system may have a non-linear character. Such distortions can be corrected for by using geometric transformations having a dependence on the pixel-address to be transformed. This is e.g. achieved by employing a matrix U and a transformation vector t having matrix-elements and vector-components, respectively, that depend on the coordinates of pixels to be transformed.

Coordinates of discrete pixels in an image consisting of pixels arranged along rows and columns have integer values, a first coordinate indicating the pixel-number along a row-direction, a second coordinate indicating a pixel-value along a column direction. Because the coordinates of pixels in the transformed image, as calculated by any of the hereinbefore mentioned implementations, will generally not coincide with integer-valued pixel-positions, some kind of interpolation will be needed to approximate the value of a pixel having a position that lies somewhere between integer pixel-positions. In order to keep the pixel-interpolation algorithm very simple to be able to generate output pixels at a sufficiently high pixel-rate, e.g. (e.g. 10 Mpix s$^{-1}$ nearest-neighbor interpolation is performed; the calculated coordinates are rounded to integer values to find the nearest pixel of which the pixel-value can be used without any processing. In the particular situation shown in FIG. 3, the pixel denoted B is closest to the fractional pixel-position P so that by nearest-neighbor interpolation the pixel-value of pixel B is assigned to the pixel P', where P=GP'.

A more sophisticated method of interpolation is bilinear interpolation. For assigning a pixel-value to P' the following interpolation is performed. Let $P_\alpha$ denote pixel values of pixel $\alpha=A,B,C, \ldots$, then the interpolated value given by $$P_{P'}=(1-a)(1-b)P_A+(1-a)bP_B+(1-b)aP_C+abP_D, \text{ where}$$

$$a=|x_2(P)-x_2(A)|/|x_2(C)-x_2(A)|,$$

$$b=|x_1(P)-x_1(A)|/|x_1(B)-x_1(A)|.$$

Such a bilinear interpolation method takes into account image information of more than only the closest pixel of pixels surrounding the fractional pixel-position. As a consequence it is avoided that image artifacts may be introduced by the geometrical transformation.

Figure 4A:
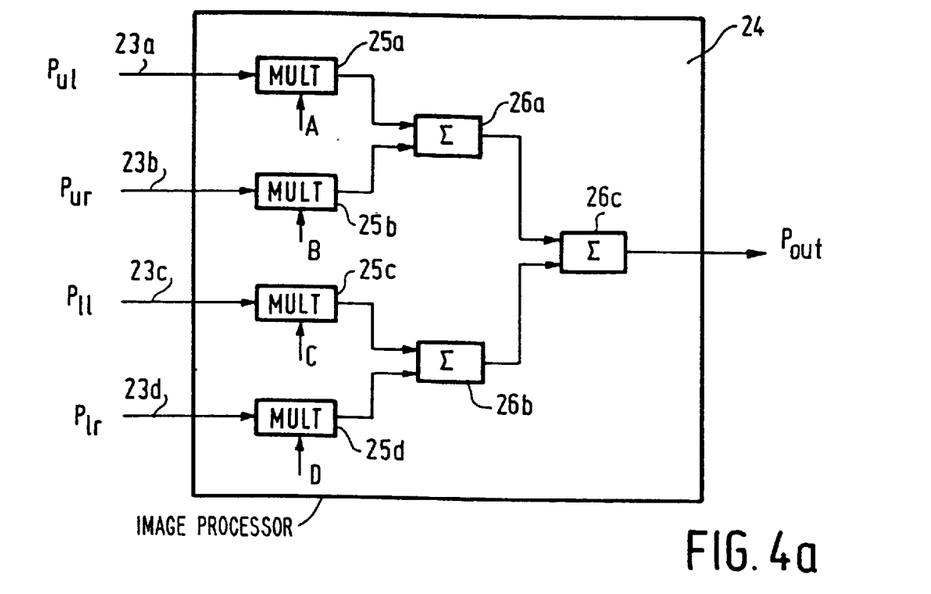
FIG. 4a shows a schematic block diagram of a signal image processor incorporating means for performing image recombining and evening for incorporation in an x-ray examination apparatus according to the invention.
Figure 4B:
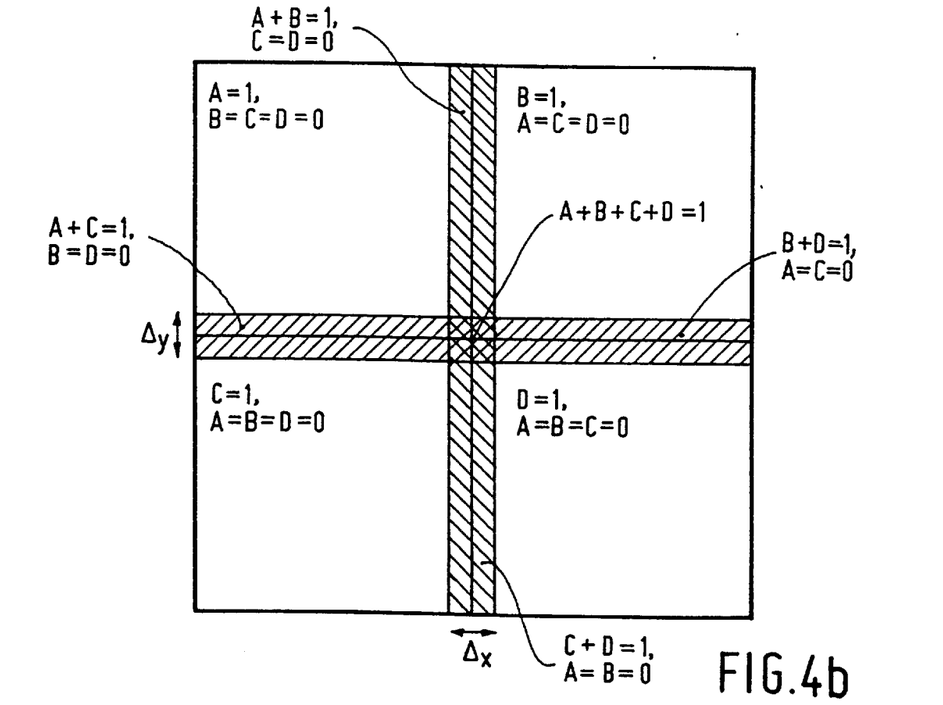
FIG. 4b shows the relations between weight-factors employed for assembling a recombined image, in different regions of the recombined image

FIG. 4a shows a schematic block diagram of an signal processing means incorporating means for performing image recombining and evening for incorporation in an x-ray examination apparatus according to the invention. Pixel-streams 23a–d provide input data for the signal processor 24. As an example an embodiment wherein a recombined image is assembled from four sub-images, denoted respectively as upper-left, upper-right, lower-left and lower-right sub-images is referred to in FIG. 4. When the signal processing means 24 is in operation, each pixel-stream contains a pixel-value corresponding to a position in the recombined image. The values are then combined in dependence of a pixel being common to a multitude of transformed electronic sub-images. To that end the pixel-values are combined according to the weighted-average relation $P_{out}=AP_{ul}+BP_{ur}+CP_{ll}+DP_{lr}$. Whenever $P_{out}$ represents a pixel-value of a pixel that lies only in the upper-left sub-image, then only $P_{ul}$ will contain valued data and correspondingly a first weight-factor A is set to the value one, and second, thirds and fourth weight-factors B,C,D are set to zero. So for pixel-values of pixels outside overlapping regions of sub-images, the weighted-averaging amounts to a switch function for selecting one of four possible pixels. In the overlapping regions, however, multiple weight-factors will have values different from zero. FIG. 4b shows the relations between the weight-factors in different regions of the recombined image. The multiplications of pixel-values and relevant weight-factors are performed by multipliers 25a–d; in a preferred embodiment said multipliers have the form of look-up-tables in which all possible products of (digital) pixel-values and weight-factors are stored. The weighted average can finally be computed by adding by way of addition means 26a–c the results of the multiplication so as to form the result of the weighted average $P_{out}$.

Figure 5:
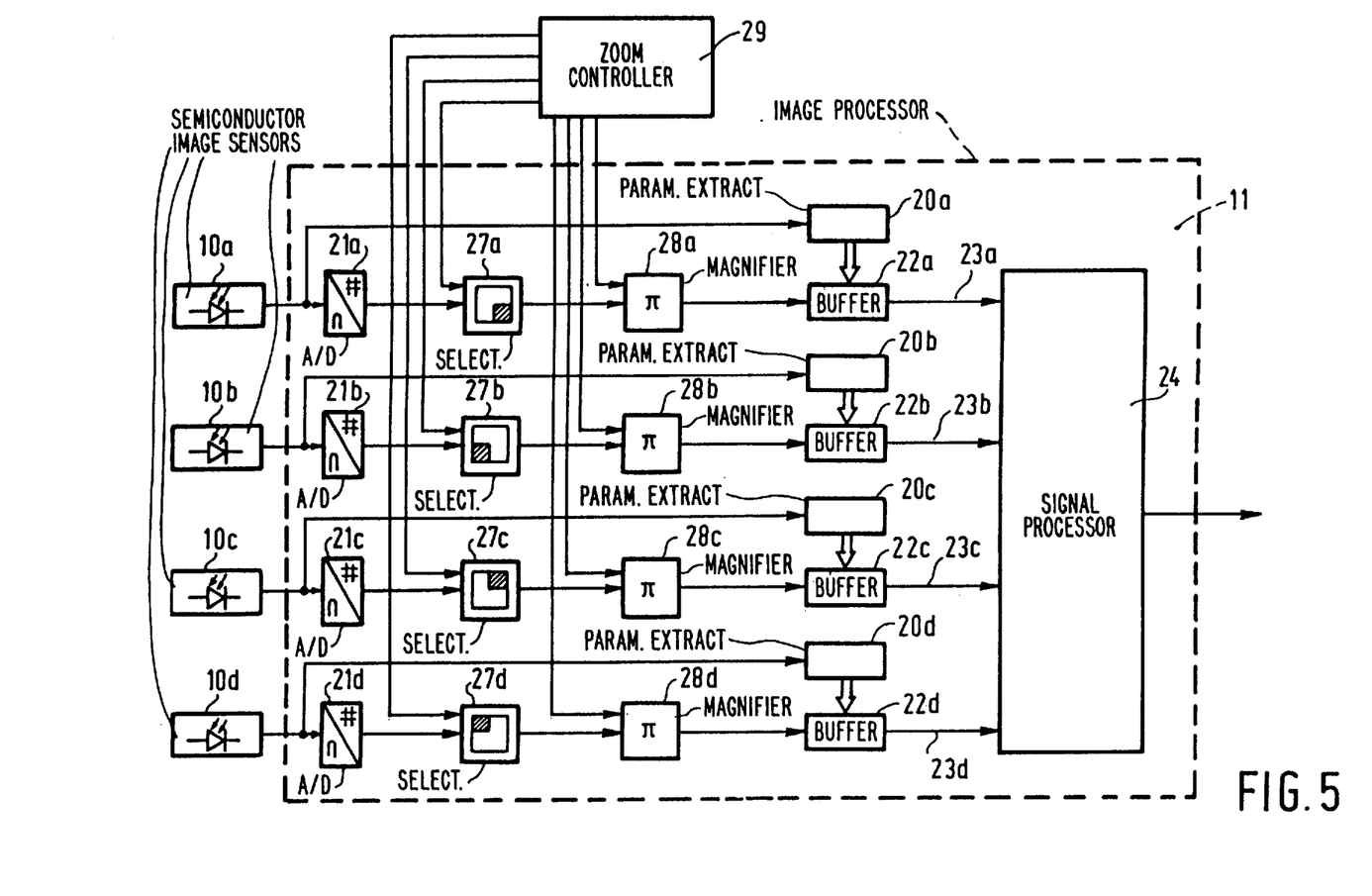
FIG. 5 shows a schematic block diagram of an image processing arrangement for incorporation in an x-ray examination apparatus according to the invention and incorporating means for zooming into a selected region of interest.

FIG. 5 shows a schematic block diagram of an image processor for incorporation in an x-ray examination apparatus according to the invention and incorporating means for zooming into a selected region of interest. A region of interest can be selected by a zoom controller 29 which controls selectors 27a–d and magnifiers 28a–d. In order to produce a recombined image of a selected region of interest of the image on the output screen of the image intensifier a zooming means is provided. Said zooming means incorporates selectors 27a–d for selecting electronic image portions of primary electronic images generated by respective image sensors 10a–d. Appropriate magnifications are applied to said electronic image portions by respective magnifiers 28a–d. The magnified electronic image portions are subjected to appropriate geometric transformations by the transformation means formed by the parametric extractors 20a–d and buffers 22a–d. By assembling the magnified and transformed electronic image portions by way of the signal processor 24 a recombined image of the region of interest is displayed on the monitor 13 or supplied to the output buffer circuit 14.

We claim:

1. An x-ray examination apparatus comprising an x-ray source for producing an x-ray image by irradiating an object, an imaging arrangement incorporating radiation conversion means for converting said x-ray image into a visible image, a plurality of image sensors for converting sub-images in the form of neighboring parts of the visible image into primary electronic sub-images, which primary electronic sub-images are subject to unwanted differences in orientation between them, and image processing means for producing a recombined electronic image from said primary electronic sub-images, said image processing means comprising transformation means for producing transformed electronic sub-images by performing respective geometrical transformations separately on respective primary sub-images to substantially eliminate any such unwanted differences in orientation between said transformed electronic sub-images, and a pixel value interpolation means for determining values of pixels of the recombined electronic image which correspond to sensor elements of image sensors lying close to neighboring edges of such image sensors, by a weighted average between values of pixels lying close to neighboring edges of the transformed electronic sub-images.

2. An x-ray examination apparatus as claimed in claim 1, wherein the imaging arrangement further comprises memory means for storing electronic sub-images, an electronic sub-image having the form of pixel-values having pixel-addresses, a pixel-address corresponding to a position in a relevant electronic sub-image, a pixel-value pertaining to said pixel-address corresponding to a brightness value of said position in a relevant electronic sub-image, characterized in that said transformation means is arranged for assigning pixel addresses of respective primary electronic sub-images to pixel addresses of respective transformed electronic sub-images.

3. An x-ray examination apparatus as claimed in claim 1, wherein the imaging arrangement further comprises memory means for storing electronic sub-images, an electronic sub-image having the form of pixel-values having pixel-addresses, a pixel-address corresponding to a position in a relevant electronic sub-image, a pixel-value pertaining to said address corresponding to a brightness value of said position in a relevant electronic sub-image, characterized in that said transformation means is arranged for assigning pixel addresses of respective transformed electronic sub-images to pixel addresses of respective primary electronic sub-images.

4. An x-ray examination apparatus as claimed in claim 3, characterized in that the transformation means comprises a pixel-value interpolation means for determining a pixel-value for a pixel of a respective transformed electronic sub-image whereto a pixel-address of a respective primary electronic sub-image is assigned.

5. An x-ray examination apparatus as claimed in claim 4, characterized in that the pixel-value interpolation means are arranged for nearest-neighbor interpolation.

6. An x-ray examination apparatus as claimed in claim 4, characterized in that the pixel-value interpolation means are arranged for bi-linear interpolation.

7. An x-ray examination apparatus as claimed in claim 4, characterized in that the pixel-value interpolation means are arranged for cubic-spline interpolation.

8. An x-ray examination apparatus as claimed in claim 1, characterized in that the transformation means comprises a look-up-table for converting addresses of respective first electronic sub-images into addresses of respective second electronic sub-images, pixel-addresses of said first and second electronic sub-images, respectively, being related by a geometrical transformation.

9. An x-ray examination apparatus as claimed in claim 1, characterized in that the transformation means comprises address-value computation means for computing address-values for respective second electronic images from addresses of respective first electronic images, being related by a geometrical transformation.

10. An x-ray examination apparatus as claimed in claim 1, characterized in that each geometrical transformation comprises a translation and a rotation.

11. An x-ray examination apparatus as claimed in claim 10, characterized in that each geometrical transformation is dependent on pixel-addresses of pixels of primary sub-images.

12. An x-ray examination apparatus comprising an x-ray source for producing an x-ray image by irradiating an object, an imaging arrangement incorporating radiation conversion means for converting said x-ray image into a visible image, a plurality of image sensors for converting sub-images in the form of parts of the visible image, each part containing a different plurality of pixels, into primary electronic sub-images, which primary electronic sub-images are subject to unwanted differences in orientation between them, and image processing means for producing a recombined electronic image from said primary electronic sub-images, said image processing means comprising transformation means for producing transformed electronic sub-images by performing respective geometrical transformations separately on respective primary sub-images to substantially eliminate any such unwanted differences in orientation between said electronic sub-images, said transformation means comprising pixel address interpolation means for determining integer pixel addresses from fractional pixel addresses.

13. An x-ray examination apparatus as claimed in claim 12, characterized in that said pixel-address interpolation means are arranged for determination of integer pixel addresses determined by rounding off computed fractional pixel addresses to the nearest integer value.

14. An x-ray examination apparatus as claimed in claim 1, characterized in that the image processing means comprise amplification means for amplifying respective primary electronic sub-images.

15. An x-ray examination apparatus as claimed in claim 1, characterized in that the transformation means is arranged as digital circuit means.

16. An x-ray examination apparatus as claimed in claim 1, characterized in that said image processing means comprise zooming means for magnifying selected portions of said transformed electronic sub-images into said recombined electronic image.

17. An x-ray examination apparatus as claimed in claim 1, characterized in that said radiation conversion means is a parallel-plate x-ray image intensifier.

18. An imaging arrangement for converting an x-ray image into a visible image, a plurality of image sensors for converting sub-images in the form of neighboring parts of the visible image into primary electronic sub-images, which primary electronic sub-images are subject to unwanted differences in orientation between them, and image processing means for producing a recombined electronic image from said primary electronic sub-images, said image processing means comprising transformation means for producing transformed electronic sub-images by performing respective geometrical transformations separately on respective primary sub-images to substantially eliminate any such unwanted differences in orientation between said transformed electronic sub-images, and a pixel value interpolation means for determining values of pixels of the recombined electronic image which correspond to sensor elements of image sensors lying close to neighboring edges of such image sensors, by a weighted average between values of pixels lying close to neighboring edges of the transformed electronic sub-images.

* * * * *